US006568895B2

(12) United States Patent
Dumenil et al.

(10) Patent No.: US 6,568,895 B2
(45) Date of Patent: May 27, 2003

(54) FEEDER SYSTEM FOR FEEDING OBJECT-CARRIERS WITH OBJECTS, IN PARTICULAR FOR PRINTING MACHINES, AND A PRINTING MACHINE EQUIPPED WITH THE SYSTEM

(75) Inventors: François Dumenil, Chaumes en Brie (FR); Gilles Marette, Coulommiers (FR)

(73) Assignee: Les Machines Dubuit, Noisy le Grand (FR)

( * ) Notice: Subject to any disclaimer, the term of this patent is extended or adjusted under 35 U.S.C. 154(b) by 0 days.

(21) Appl. No.: 09/800,747

(22) Filed: Mar. 8, 2001

(65) Prior Publication Data

US 2001/0020568 A1 Sep. 13, 2001

(30) Foreign Application Priority Data

Mar. 9, 2000 (FR) ........................................... 00 03030

(51) Int. Cl.[7] ............................................... B65G 47/00
(52) U.S. Cl. .................... 414/18; 414/746.4; 198/468.1
(58) Field of Search ............................... 414/746.4, 18; 198/740, 468.1

(56) References Cited

U.S. PATENT DOCUMENTS 3,453,167 A * 7/1969 Arvidson et al. ........ 198/468.1
4,469,214 A * 9/1984 Maurer et al. ........... 198/468.1
4,936,736 A * 6/1990 Meier ...................... 414/746.4
5,220,997 A * 6/1993 Ushiki et al. ............ 198/468.1
5,320,008 A * 6/1994 Cucchi ........................ 414/18
5,393,196 A * 2/1995 Bluemle ..................... 198/740
5,695,044 A * 12/1997 Morikiyo et al. ........... 198/740
6,012,893 A * 1/2000 Drei et al. ............... 414/746.4
6,106,219 A * 8/2000 Newsome et al. ....... 198/468.1

FOREIGN PATENT DOCUMENTS

| | | | | |
|---|---|---|---|---|
| FR | 2 670 759 | | 6/1992 | |
| FR | 2 782 292 | | 2/2000 | |
| GB | 2 174 667 | | 11/1986 | |
| JP | 406156641 A | * | 6/1994 | .............. 414/746.4 |

* cited by examiner

*Primary Examiner*—Kathy Matecki
*Assistant Examiner*—Sang Kim
(74) *Attorney, Agent, or Firm*—Young & Thompson

(57) ABSTRACT

A feeder system for feeding objects to object-carriers of a machine for processing the objects, in particular a printing machine, includes a reciprocating finger for pushing each object directly towards an object-carrier to place the object on the object-carrier; the finger being carried by a reciprocating carriage slidably mounted on a chassis and rotatably mounted on the carriage so that it can occupy at least an operational position in which it can push an object when it is moved and a retracted position in which it can avoid an object when it is moved.

17 Claims, 4 Drawing Sheets

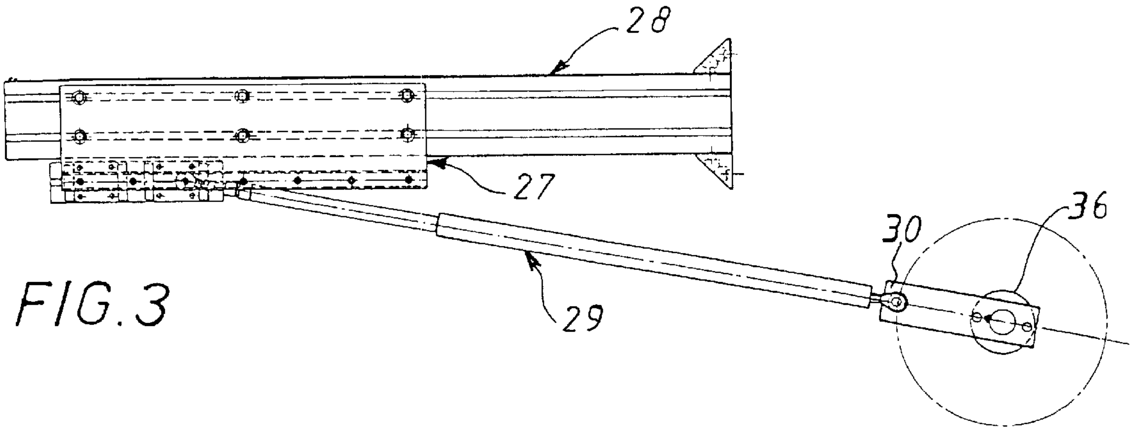
FIG. 3
FIG. 4
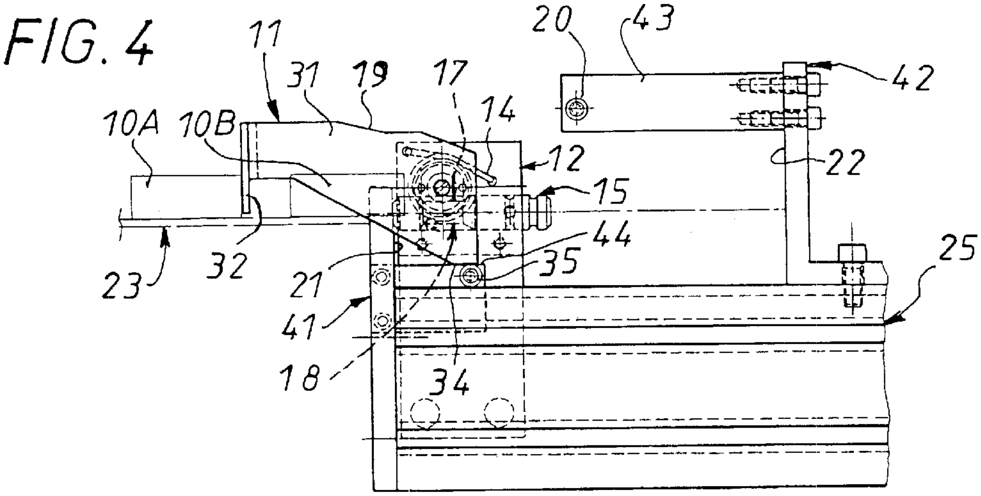
FIG. 5
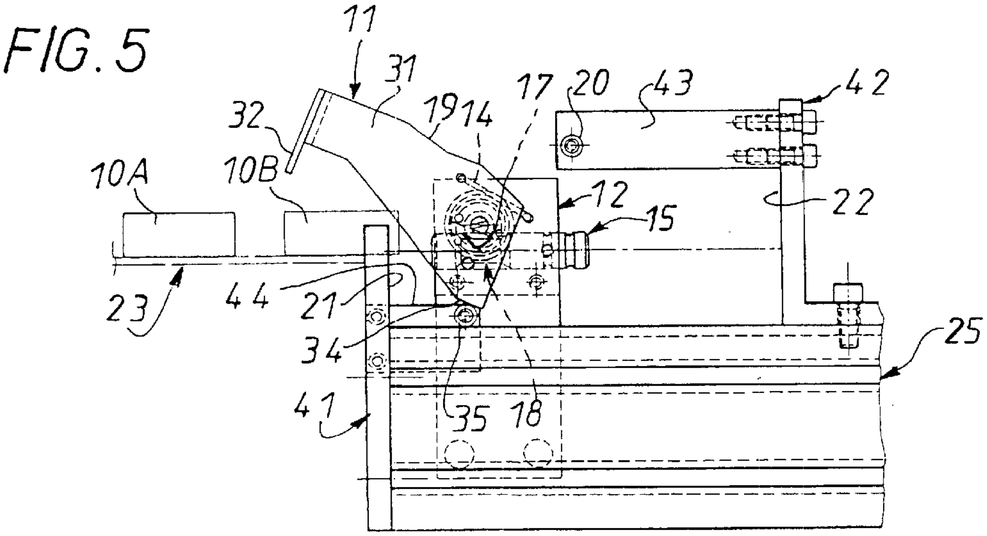

FEEDER SYSTEM FOR FEEDING OBJECT-CARRIERS WITH OBJECTS, IN PARTICULAR FOR PRINTING MACHINES, AND A PRINTING MACHINE EQUIPPED WITH THE SYSTEM

BACKGROUND OF THE INVENTION

The present invention relates generally to machines for processing objects, for example printing machines including a turret, which can rotate about its axis and which carries a plurality of object-carriers radially at its periphery via supports which are in turn rotatably mounted on the turret, and a plurality of workstations distributed circumferentially around the turret, in line with the trajectory of the object-carriers, and some of which are printing stations while others are processing stations, for example drying, varnishing, flame treatment, dust removal or other stations.

DESCRIPTION OF THE RELATED ART

The printing machines are used to print circular objects, for example, such as flexible tubes made of synthetic or other materials and to be printed with several different colours in succession; in this case the object-carriers are cylindrical mandrels onto which the objects are threaded.

Feeder systems are of course provided for feeding the object-carriers with the objects.

Until now the feeder systems have included a finger, generally of cylindrical shape, reciprocating along its axis and adapted to push each object directly towards an object-carrier.

Although these systems operate well, they nevertheless have the disadvantage that, to access the next object to be pushed, the finger must be retracted by a distance at least equal to the length of the object, and that it is only after this movement, which frees the space for the next object, that the next object can take up its place.

SUMMARY OF THE INVENTION

The subject matter of the present invention is a feeder system in which the next object to be pushed takes up its place before the finger has effected its retraction stroke, which increases the feed rate.

In accordance with the invention, a feeder system for feeding objects to object-carriers of a machine for processing the objects, in particular a printing machine, said system including a reciprocating finger for pushing each object directly towards an object-carrier to place the object on said object-carrier, is characterised in that said finger is carried by a reciprocating carriage slidably mounted on a chassis and is rotatably mounted on said carriage so that it can occupy at least an operational position in which it can push an object when it is moved and a retracted position in which it can avoid an object when it is moved.

Said finger is advantageously also subjected to the action of spring means which urge it towards its retracted position and locking means are provided for temporarily retaining the finger in its operational position against the action of the spring means.

The finger is preferably fastened to a shaft rotatably mounted on the carriage and the spring means comprise a spiral spring wound around said shaft.

The locking means advantageously comprise a plunger mounted to slide in a direction orthogonal to the rotation axis of the finger.

In the position of the plunger in which the shaft is locked relative to the carriage the outside surface of the plunger preferably cooperates with a flat surface formed on the shaft.

The plunger advantageously has a peripheral groove which in the position in which the shaft is unlocked is in line with said flat surface.

The carriage preferably reciprocates between two abutments carried by the chassis.

The plunger is advantageously adapted to cooperate with the abutment in its locking position and with the abutment in its unlocking position, the carriage being in line with said abutments in each of those positions.

The finger preferably includes an operational position selector ramp adapted to cooperate with a fixed roller carried by the chassis.

The invention also provides a machine, in particular a printing machine, including object-carriers and a feeder system for feeding the object-carriers with objects, characterised in that the feeder system is a system as defined above.

The objects are advantageously carried by an inclined table.

The objects are preferably retained by a rim of the table and the rim is parallel to the rotation axis of the finger.

Said finger is advantageously generally C-shaped and straddles said rim.

BRIEF DESCRIPTION OF THE DRAWINGS

To explain further the subject matter of the invention, an embodiment of the invention shown in the accompanying drawings will now be described by way of purely illustrative and non-limiting example.

In the drawings

FIG. 3 is a partial bottom view relative to FIG. 1 showing a drive link of the carriage;

FIG. 4 is a partial view as seen in the direction of the arrow IV in FIG. 1; and FIGS. 5 to 10 are views analogous to FIG. 4 showing various steps in the operation of the feeder system.

DESCRIPTION OF THE PREFERRED EMBODIMENTS

The figures show, by way of example, the application of the invention to the situation in which the objects to be printed are flexible tubes, for example, intended to contain a more or less paste-like product, such as cream, which tubes include a body and a bottom. The body is globally cylindrical and its cross section is substantially circular.

The printing machine used to print these objects, only part of which is shown in the figures, is of the type described in U.S. Pat. No. 6,164,199, for example, and globally comprises, as known in the art, a turret which is rotatable on a frame about is axis, which in this instance is a vertical axis, and which carries radially at its periphery a plurality of object-carriers each of which is in turn rotatably mounted on the turret by means of a respective support, their rotation axes being orthogonal to the axis of the turret in this example, and therefore horizontal.

The turret is generally a simple circular contour plate rotatably mounted on a table that is part of the frame. This is known in the art.

The turret is driven stepwise in rotation by a motor associated with an indexing device. This is known in the art.

Because the objects to be printed are flexible tubes, the object-carriers are cylindrical mandrels onto which the objects are simply threaded.

The corresponding arrangements are well known in the art and are not described in more detail here.

The printing machine includes a plurality of workstations which are circumferentially distributed around the turret in line with the trajectory of the object-carriers and some of which are printing stations while others are processing stations. This is known in the art.

The system is completed by a loading and offloading station and workstations for processing the objects before they are printed, for example a flame treatment and dust removal station and a varnishing station followed by a drying station.

The machine includes a feeder system shown in FIGS. 1 to 4 adapted to feed objects to the object-carriers.

Figure 1:
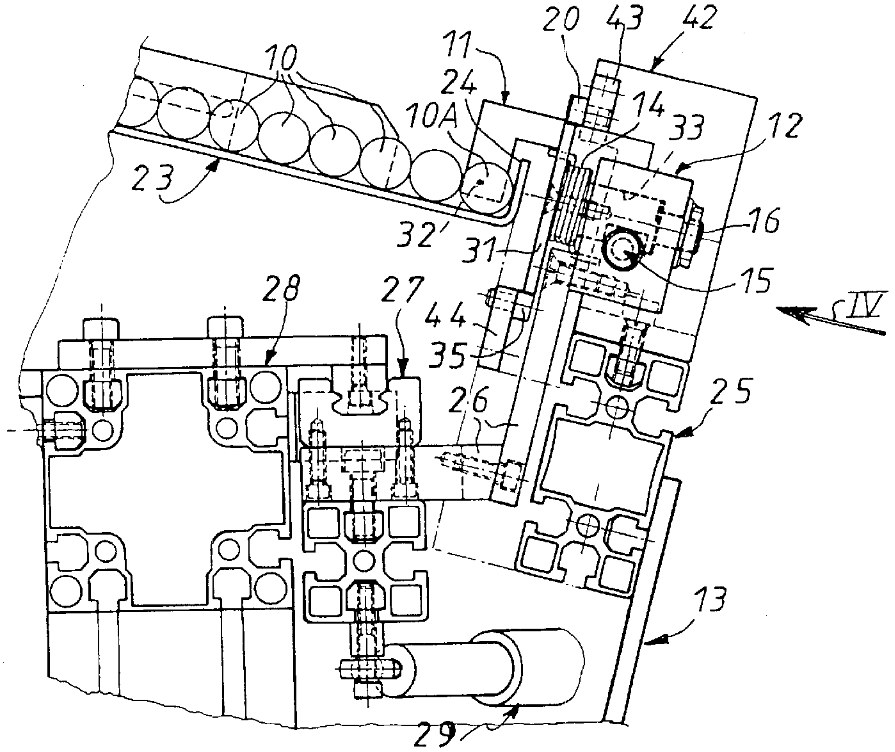
FIG. 1 is a partial elevation view of a machine equipped with a feeder system according to the invention.
Figure 2:
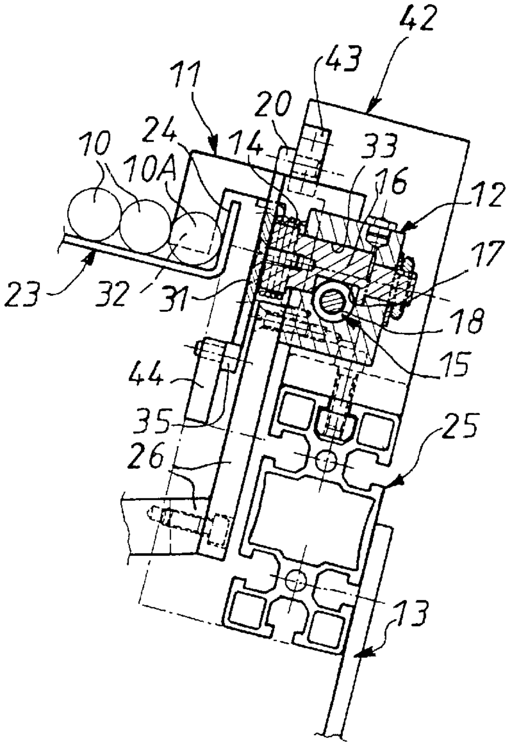
FIG. 2 is a partial view of FIG. 1 showing in section a carriage carrying a finger.

The cylindrical objects 10 are perpendicular to the plane of FIGS. 1 and 2 and are placed on an inclined table 23; they are caused to come into contact with each other by their weight alone, with the first object 10A abutted against a transverse rim 24 of the inclined table 23.

A feed finger 11 is carried by a carriage 12 slidably mounted on a chassis 13. The carriage 12 reciprocates; to this end, it is fastened by arms 26 to a sled 27 in turn slidably mounted on a rail 28; the sled 27 is coupled to a link 29 in turn coupled to a crank 30 (see FIG. 3) fastened to the shaft 36 of a motor incorporated in the machine.

Accordingly, when the shaft 36 turns, the sled 27 is moved on the rail 28 with a reciprocating motion that is transmitted by the arm 26 to the carriage 12.

The finger 11 is cut and bent to shape from sheet metal and includes a plane body 31 and a plane beak 32 in a plane perpendicular to the plane body 31; the beak 32 and the body 31 have a generally C-shaped configuration so that the body 31 and the beak 32 can be placed on respective opposite sides of the rim 24 of the inclined table 23; the body 31 is parallel to the rim 24 and the beak 32 is transverse to the objects 10.

The carriage 12 includes a bore 33 in which is rotatably mounted a shaft 16 fastened to the plane body 31, in this example perpendicularly to said body 31, and therefore fastened to the finger 11.

The shaft 16 incorporates a cut-out whose back defines a flat surface 17 parallel to the axis of the shaft 16 (see FIG. 2).

The shaft 16 is surrounded by a spiral spring 14 one end of which is carried by the plane body 31 of the finger 11 and whose other end is fastened to the carriage 12; accordingly, the spiral spring 14 bears against the carriage 12 and urges the finger 11 to rotate in the direction which raises the beak 32, as explained below.

The axis of a cylindrical passage through the carriage 12 is orthogonal to the axis of the bore 33 and tangential to said bore 33; a plunger 15 is slidably mounted in said passage; for the plunger 15 to be able to serve as a locking member for immobilising the shaft 16 relative to the carriage 12 in the bore 33, its diameter is such that it is tangential to the flat surface 17 on the shaft 16; to unlock the shaft 16, the plunger has a groove 18 (see FIG. 2) whose depth is such that when said groove 18 is in line with the flat surface 17, after the plunger 15 has been moved to bring this about, the shaft 16 is free to rotate inside the bore 33.

As it reciprocates, the carriage 12 moves between two abutments 21 and 22 carried by the chassis 13, in this example by means of a spacer 25; one abutment 21 is the inside face of a plate 42 fixed to the end of the spacer 25 and the other abutment 22 is the inside face of one flange of an L-shaped bracket 42 fixed to the top face of the spacer 25.

In this example the spacer 25 is parallel to the rail 28 and inclined at an angle equal to the angle of inclination of the table 23, as can be seen in FIGS. 1 and 2. This is not necessarily the case, however.

Figure 8:
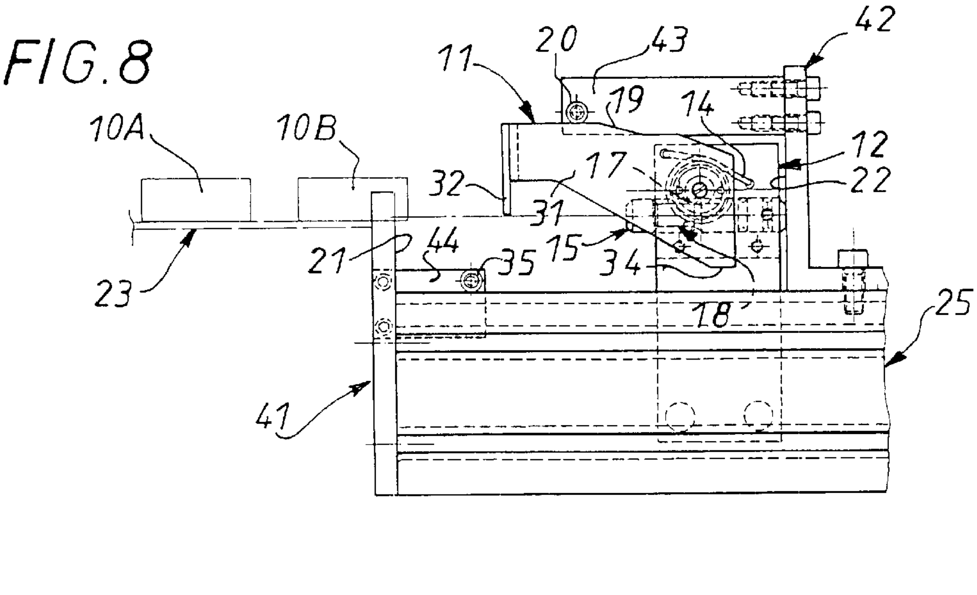

The length of the plunger 15 is greater than that of the passage through the carriage 12 in which it is housed, so that in each extreme position of the carriage 12, in line with the abutment 21 or 22, the plunger 15 is adapted to cooperate with each abutment and to be moved one way or the other; when it is cooperating with the abutment 21 (FIG. 4) the plunger 15 is in the position which unlocks the shaft 16, and the groove 18 is in line with the flat surface 17, and when it is cooperating with the abutment 22 (FIG. 8) the plunger 15 is in the position which locks the shaft 16, and the groove 18 is no longer in line with the flat surface 17.

This is how the feeder system according to the invention works.

In FIG. 4, the finger 11 is at the end of its operational stroke and the beak 32 of the finger 11 has threaded the hollow cylindrical object 10A onto the object-carrier mandrel, not shown; the plunger 15 is cooperating with the unlocking abutment 21 and the shaft 16 can be turned in the carriage 12 by the spiral spring 14; in this example it is preferred that the finger 11 rest momentarily in this position, a heel-piece 34 of the finger 11 cooperating with a roller 35 at a greater distance from the abutment 21 than the rotation axis of the shaft 16, and said roller 35 being carried by a support 44 attached to the end plate 41.

Figure 6:
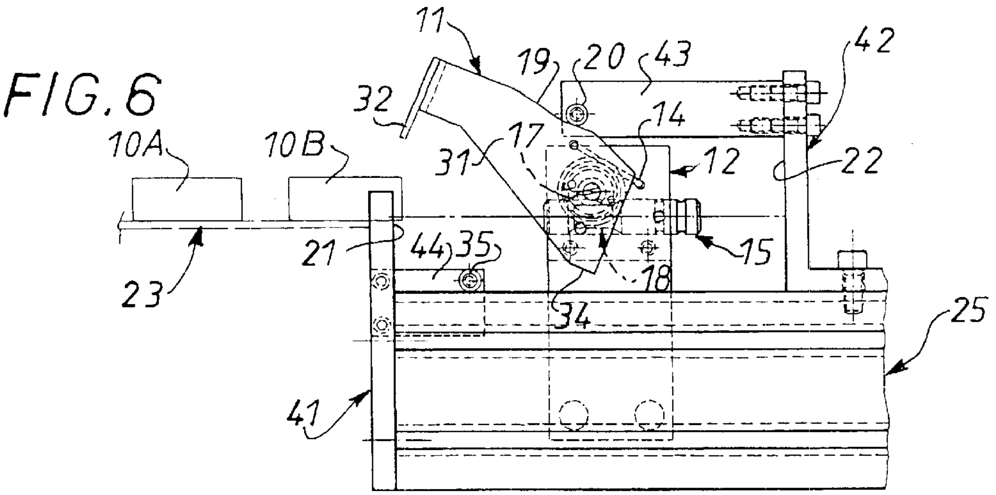

During its return stroke (FIG. 5) the finger 11 turns about its axis, progressively freeing the passage for the next object 10B to take up its position; at about the half-way point of its return stroke (FIG. 6) the heel-piece 34 leaves the roller 35 and the back of the finger 11 abuts against a roller 20 at the end of a boom 43 carried by the L-shaped bracket 42.

Note that in this position the next object 10B is ready to be threaded onto the object-carrier even though the finger 11, i.e. the carriage 12, is only at the half-way point of its travel.

Figure 7:
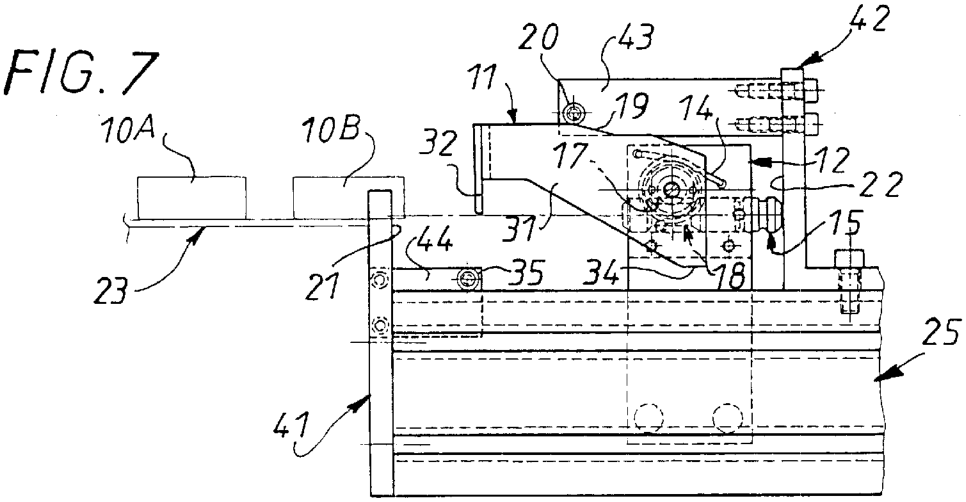

As the return movement of the carriage 12 continues, a ramp 19 on the finger 11 cooperates with the roller 20 to return the finger 11 to its operational position against the action of the spring 14 (see FIG. 7).

Figure 9:
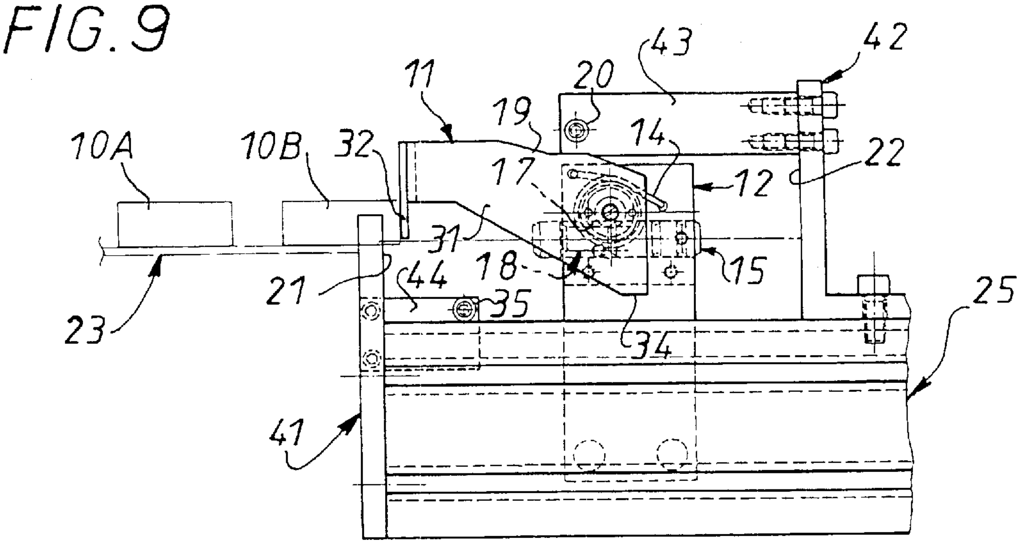
Figure 10:
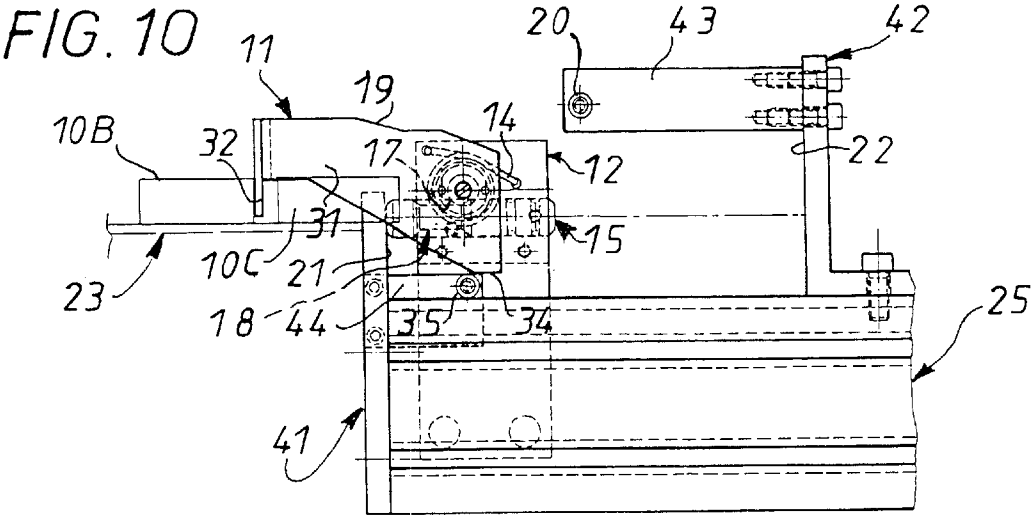

The cooperation of the plunger 15 with the locking abutment 22 (FIG. 8) immobilises the shaft 16, and therefore the finger 11, in this position, which it retains until it takes up the object 10B (FIG. 9); the operational travel of the carriage 12 continuing, the plunger 15 comes into contact with the abutment 21 (FIG. 10) and then unlocks the shaft 16 while the object 10B is threaded onto the object-carrier: the situation is therefore that of FIG. 4 again, and a new cycle begins.

What is claimed is:

1. A feeder system for feeding objects to object-carriers of a machine for processing the objects, said system comprising:

a reciprocating finger (11) for pushing each object (10) directly towards an object-carrier to place the object (10) on said object-carrier, said finger (11) being carried by a reciprocating carriage (12) slidably mounted on a chassis (13) and is rotatably mounted on said carriage (12) so that it can occupy at least an operational position in which it can push an object (10) when it is moved and a retracted position in which it can avoid an object (10) when it is moved, said finger (11) being also subjected to the action of spring means (14) which urge it towards its retracted position; and locking means (15) provided for temporarily retaining the finger (11) in its operational position against the action of the spring means (14), wherein the finger (11) is fastened to a shaft (16) rotatably mounted on the carriage (12) and the spring means (14) comprise a spiral spring wound around said shaft (16), the locking means (15) comprise a plunger mounted to slide in a direction orthogonal to the rotation axis of the finger (11).

2. A feeder system according to claim 1, characterised in that in the position of the plunger (15) in which the shaft (16) is locked relative to the carriage (12) the outside surface of the plunger (15) cooperates with a flat surface (17) formed on the shaft (16).

3. A feeder system according to claim 2, characterised in that the plunger (15) has a peripheral groove (18) which in the position in which the shaft (16) is unlocked is in line with said flat surface (17).

4. A feeder system according to claim 3, characterised in that the carriage (12) reciprocates between two abutments (21, 22) carried by the chassis (13).

5. A feeder system according to claim 4, characterised in that the plunger (15) is adapted to cooperate with the abutment (22) in its locking position and with the abutment (21) in its unlocking position, the carriage (12) being in line with said abutments (21, 22) in each of those positions.

6. A printing machine, including object-carriers and a feeder system for feeding the object-carriers with objects, characterised in that the feeder system is a system according to claim 1.

7. A machine according to claim 6, characterised in that the objects are carried by an inclined table (23).

8. A machine according to claim 7, characterised in that the objects (10) are retained by a rim (24) of the table (23) and the rim (24) is parallel to the rotation axis of the finger (11).

9. A machine according to claim 8, characterised in that the objects (10) are retained by a rim (24) of the table (23) and the rim (24) is parallel to the rotation axis of the finger (11).

10. A feeder system for feeding objects to object-carriers of a machine for processing the objects, said system comprising:

a reciprocating finger (11) for pushing each object (10) directly towards an object-carrier to place the object (10) on said object-carrier, said finger (11) being carried by a reciprocating carriage (12) slidably mounted on a chassis (13) and is rotatably mounted on said carriage (12) 50 that it can occupy at least an operational position in which it can push an object (10) when it is moved and a retracted position in which it can avoid an object (10) when it is moved, said finger (11) being also subjected to the action of spring means (14) which urge it towards its retracted position, and locking means (15) provided for temporarily retaining the finger (11) in its operational position against the action of the spring means (14), wherein the finger (11) includes an operational position selector ramp (19) adapted to cooperate with a fixed roller (20)carried by the chassis (13).

11. A printing machine, including object-carriers and a feeder system for feeding the object-carriers with objects, characterised in that the feeder system is a system according to claim 10.

12. A machine according to claim 11, characterised in that the objects are carried by an inclined table (23).

13. A machine according to claim 12, characterised in that the objects (10) are retained by a rim (24) of the table (23) and the rim (24) is parallel to the rotation axis of the finger (11).

14. A printing machine, including object-carriers and a feeder system for feeding the object-carriers with objects, characterised in that the feeder system is a system comprising a reciprocating finger (11) for pushing each object (10) directly towards an object-carrier to place the object (10) on said object-carrier, said finger (11) being carried by a reciprocating carriage (12) slidably mounted on a chassis (13) and is rotatably mounted on said carriage (12) SO that it can occupy at least an operational position in which it can push an object (10) when it is moved and a retracted position in which it can avoid an object (10) when it is moved, said finger (11) being also subjected to the action of spring means (14) which urge it towards its retracted position, and locking means (15) provided for temporarily retaining the finger (11) in its operational position against the action of the spring means (14).

15. A machine according to claim 14, characterised in that the objects are carried by an inclined table (23).

16. A machine according to claim 15, characterised in that the objects (10) are retained by a rim (24) of the table (23) and the rim (24) is parallel to the rotation axis of the finger (11).

17. A machine according to claim 16, characterised in that said finger (11) is generally C-shaped and straddles said rim (24).

* * * * *